United States Patent

Adachi

[11] Patent Number: 5,877,903
[45] Date of Patent: Mar. 2, 1999

[54] OPTICAL MEMBER FIXING STRUCTURE

[75] Inventor: Takashi Adachi, Kanagawa-ken, Japan

[73] Assignee: Fuji Photo Film Co., Ltd., Kanagawa-ken, Japan

[21] Appl. No.: 932,243

[22] Filed: Sep. 17, 1997

[30] Foreign Application Priority Data

Sep. 17, 1996 [JP] Japan .................................. 8-245187

[51] Int. Cl.⁶ .................................................. G02B 7/02
[52] U.S. Cl. ........................................ 359/819; 359/820
[58] Field of Search ..................... 359/811, 819, 359/820

[56] References Cited

U.S. PATENT DOCUMENTS 4,805,993 2/1989 Blumentritt et al. .................... 359/820
5,526,193 6/1996 Anzai ...................................... 359/819

*Primary Examiner*—Loha Ben
*Attorney, Agent, or Firm*—Sughrue, Mion, Zinn, Macpeak & Seas, PLLC

[57] ABSTRACT

An optical member is bonded to one surface of a holder. At least a pair of grooves are formed on the surface of the holder to leave an elevated portion which is smaller than the optical element in width. The optical member is bonded to the surface of the holder only at the elevated portion.

4 Claims, 2 Drawing Sheets

OPTICAL MEMBER FIXING STRUCTURE

BACKGROUND OF THE INVENTION

1. Field of the Invention

This invention relates to a structure for fixing an optical member to a holder, and more particularly to a structure for fixing an optical member to a holder by adhesive.

2. Description of the Related Art

As disclosed, for instance, in Japanese Unexamined Patent Publication No. 62(1987)-189783, there has been known a solid state laser in which a Nd-doped laser crystal is pumped with a semiconductor laser.

In such a solid state laser, an optical member such as an etalon is often provided in a resonator in order to make the oscillation mode a single longitudinal mode or to control polarizing direction.

A relatively small optical member such as an etalon is generally fixed to a holder which is larger than the optical member in size and is held in a predetermined position. FIG. 4 shows a conventional structure for fixing an optical member 2 to a holder 1. As shown in FIG. 4, in the conventional structure, the optical element 2 is bonded to the holder 1 substantially along the entire surface 2a facing the holder 1 except the portion opposed to an aperture 1a of the holder 1. The hatched portion in FIG. 4 represents the bonding area.

Though being simple, the conventional structure is disadvantageous in that the optical member can be deformed (warped) or broken when subjected to a temperature change due to difference in the linear expansion coefficient between the holder and the optical member. This problem is especially serious when the optical member is relatively small in thickness like the etalon or the optical member is apt to generate cleavage.

SUMMARY OF THE INVENTION

In view of the foregoing observations and description, the primary object of the present invention is to provide a structure which can fix an optical member without fear that the optical member can be deformed or broken even if subjected to a temperature change.

In accordance with the present invention, there is provided a structure for bonding an optical member to one surface of a holder characterized in that at least a pair of grooves are formed on said one surface of the holder to leave therebetween an elevated portion which is smaller than the optical element in width and the optical member is bonded to said one surface of the holder only at the elevated portion.

In the case where the linear expansion coefficient of the optical member varies depending on directions in the surface which is to be bonded to said one surface of the holder, it is preferred that said elevated portion be linear and the optical member be bonded to said one surface of the holder so that the optical member has a linear expansion coefficient close to that of the holder in the direction parallel to the longitudinal direction of the elevated portion.

In the optical member fixing structure of the present invention, the grooves reduces the bonding area between the holder and the optical member, and accordingly stress acting on the optical member due to the difference in the linear expansion coefficient between the holder and the optical member when the holder-optical member assembly is subjected to a temperature change is suppressed, whereby the optical member is prevented from being deformed or broken.

Though the bonding area between the holder and the optical member may be reduced by applying adhesive only a limited part or limited parts, this approach is disadvantageous in that since the adhesive is spread when the optical member is pressed against the holder, it is difficult to control the bonding area to a desired value.

To the contrary, in the structure of the present invention, the adhesive spread when the optical member is pressed against the holder enters the grooves and is not available for bonding the optical member to the holder, and accordingly the bonding area can be precisely controlled.

Further in the longitudinal direction of the elevated portion, the bonding length is larger than that in the direction transverse to the elevated portion and accordingly stress acting on the optical member is apt to be large in the longitudinal direction of the elevated portion. However when the optical member is bonded to the holder so that the optical member has a linear expansion coefficient close to that of the holder in the direction parallel to the longitudinal direction of the elevated portion, the stress can be smaller. On the other hand, the difference in the linear expansion coefficient is larger in the direction transverse to the elevated portion. However in this direction, the bonding length is smaller by existence of the grooves as compared with that in the longitudinal direction of the elevated portion, whereby the stress acting on the optical member can be suppressed. Accordingly, excessively large stress cannot act on the optical member in a particular direction, whereby deformation and/or breakage of the optical member can be avoided.

DESCRIPTION OF THE PREFERRED EMBODIMENTS

Figure 1:
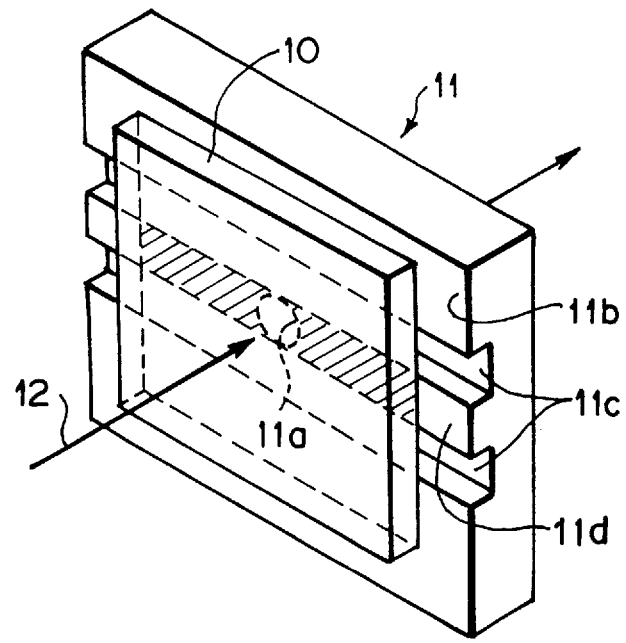
FIG. 1 is a perspective view showing an optical member fixing structure in accordance with a first embodiment of the present invention.

In the first embodiment shown in FIG. 1, a quartz etalon 10 which is disposed, for instance, in a resonator of a semiconductor laser-pumped solid state laser to make the oscillation mode of the laser a single longitudinal mode is fixed to a holder 11 of copper.

The quartz etalon 10 is 2.4 mm×2.4 mm and 0.3 mm in thickness. The holder 11 is provided with an aperture 11a at the center thereof. A surface 11b of the holder 11 to which the etalon 10 is to be bonded is formed with a pair of linear grooves 11c in parallel to each other. The grooves 11c are 0.5 mm in width and spaced from each other by 0.5 mm. Accordingly an elongated elevated portion 11d 0.5 mm wide is left between the grooves 11b.

Epoxy adhesive is applied to the surface of the elevated portion 11d and the etalon 10 is bonded to the holder 11 by the adhesive. That is, in this embodiment, the bonding area (the hatched portion in FIG. 1) is only 2.4 mm×0.5 mm.

When the etalon 10 is pressed against the holder 11 with the adhesive sandwiched therebetween, the adhesive is spread. However the spread adhesive enters the grooves 11c and is not available for bonding the etalon 10 to the holder 11, and accordingly the bonding area can be kept substantially 2.4 mm×0.5 mm.

When the etalon 10 fixed to the holder 11 in the manner described above was employed to make the oscillation mode of a solid state laser beam 12 a single longitudinal mode at a wavelength $\lambda$ of 1064 nm and was subjected to a preservation test of 70° C.×96 h. Warpage of the quartz etalon 10 was not larger than $\lambda/10$. For the purpose of comparison, a quartz etalon the same as the etalon 10 described above was bonded to a holder of copper over the entire area thereof and subjected to the same preservation test. Warpage of the quartz etalon was as large as $\lambda/2$ to $\lambda/4$. This shows that warpage of a quartz etalon can be suppressed by reducing the bonding area.

When warpage of the quartz etalon 10 can be suppressed, the wavelength selected by the etalon 10 cannot be changed with change in the environmental temperature, which results in stable drive of a semiconductor laser-pumped solid state laser.

Further as compared with spot bonding of the etalon 10 to the holder 11, the bonding structure of the embodiment described above is sufficient in the bonding area, which results in a sufficient bonding strength.

Figure 2:
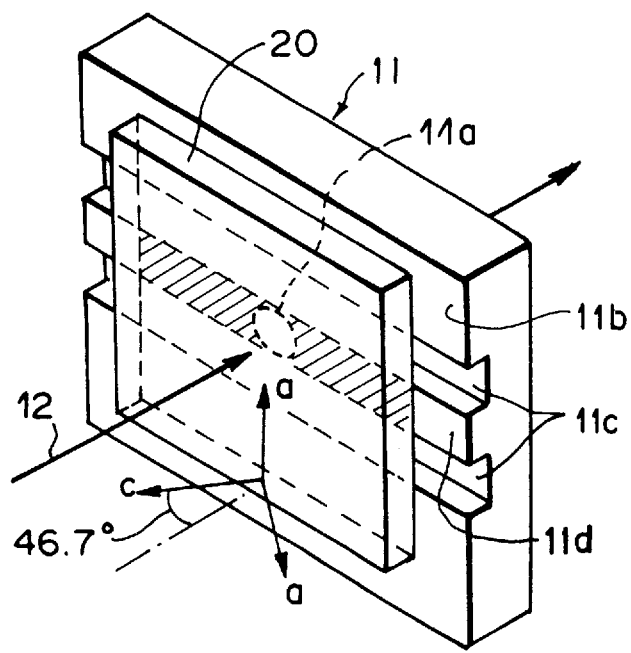
FIG. 2 is a perspective view showing an optical member fixing structure in accordance with a second embodiment of the present invention.
Figure 3:
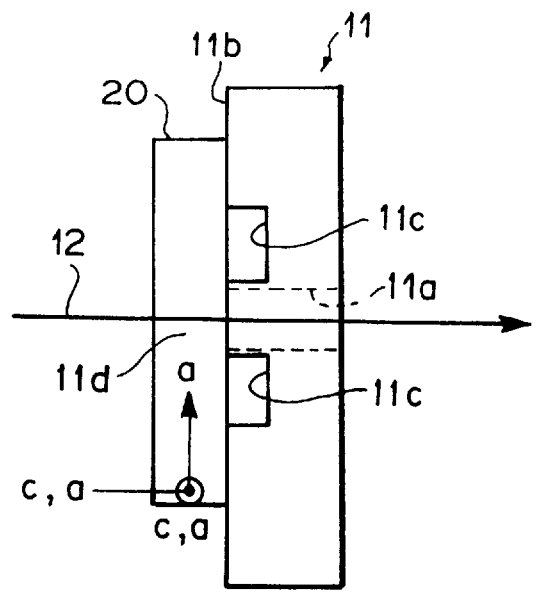
FIG. 3 is a side view of the optical member fixing structure of the second embodiment.
Figure 4:
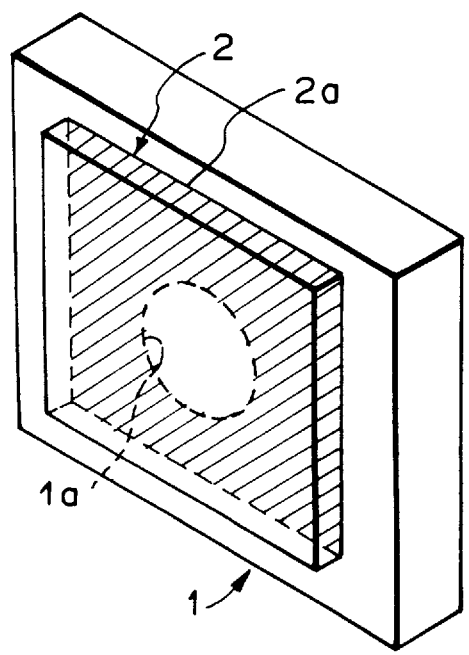
FIG. 4 is a perspective view showing an optical member fixing structure in accordance with a prior art.

In the second embodiment shown in FIGS. 2 and 3, a calcite crystal plate 20 which is disposed, for instance, in a resonator of a semiconductor laser-pumped solid state laser to control polarization is fixed to a holder 11 of copper.

The calcite crystal plate 20 is 2.4 mm×2.4 mm and 0.34 mm in thickness. The holder 11 is the same as that employed in the first embodiment. Epoxy adhesive is applied to the surface of the elevated portion 11d and the calcite crystal plate 20 is bonded to the holder 11 by the adhesive. That is, also in this embodiment, the bonding area (the hatched portion in FIG. 2) is only 2.4 mm×0.5 mm.

The calcite crystal plate 20 has been cut along a plane inclined relative to c-axis by 46.7° toward a-axis as shown in FIG. 2, and since the inclined angle is close to 450°, an intermediate direction between a-axis and c-axis is included in the cut plane. The calcite crystal plate 20 is bonded to the holder 11 with the intermediate direction oriented in parallel to the longitudinal direction of the elevated portion 11d.

The calcite crystal plate 20 has a linear expansion coefficient of $0.544 \times 10^{-5}$/°C. in the direction of a-axis and that of $2.63 \times 10^{-5}$/°C. in the direction of c-axis. Since the linear expansion coefficient of the calcite crystal plate 20 may be considered to be the average of those in the directions of a-axis and c-axis and is $1.58 \times 10^{-5}$/°C., which is very close to the linear expansion coefficient of copper, $1.67 \times 10^{-5}$/°C.

When subjected to a temperature change, the calcite crystal plate 20 is apt to generate cleavage under stress acting thereon due to the difference in the linear expansion coefficient between the calcite crystal plate 20 and the holder 11. However in the structure of this embodiment, the bonding area between the plate 20 and the holder 11 is sufficiently small and the stress acting on the plate 20 is very small. Accordingly cleavage of the calcite crystal plate 20 can be prevented.

Further as can be understood from the description above, since the calcite crystal plate 20 is bonded to the holder 11 so that the plate 20 has a linear expansion coefficient close to that of the holder 11 in the direction parallel to the longitudinal direction of the elevated portion 11d, the stress acting on the plate 20 is more suppressed and cleavage of the plate 20 is prevented more surely.

Thus cleavage of the calcite crystal plate 20 can be prevented even if hard adhesive is used.

When the calcite crystal plate 20 fixed to the holder 11 in the manner described above was subjected to a preservation test of 70° C.×96 h described above. No cleavage was observed on the calcite crystal plate 20. To the contrast, when the calcite crystal plate 20 is bonded to the holder 11 over the entire area thereof, cleavage is often generated.

In order to prevent cleavage, it is preferred that soft adhesive be employed. However soft adhesive is limited in kinds and accordingly the structure of the present invention, which permits use of hard adhesive, increases freedom is selection of adhesive.

What is claimed is:

1. A structure for bonding an optical member to one surface of a holder characterized in that at least a pair of grooves are formed on said one surface of the holder to leave therebetween an elevated portion which is smaller than the optical member in width and the optical member is bonded to said one surface of the holder only at the elevated portion.

2. A structure as defined in claim 1 in which the linear expansion coefficient of the optical member varies depending on directions in the surface which is to be bonded to said one surface of the holder, said elevated portion is linear and the optical member is bonded to said one surface of the holder so that the optical member has a linear expansion coefficient close to that of the holder in the direction parallel to the longitudinal direction of the elevated portion.

3. A structure as defined in claim 2 in which said optical member is a calcite crystal plate cut so that an intermediate direction between a-axis and c-axis is included in the cut plane, the holder is of copper and the calcite crystal plate is bonded to the holder with the intermediate direction oriented in parallel to the longitudinal direction of the elevated portion.

4. A structure as defined in claim 1 in which said optical member is a quartz etalon, and the holder is of copper.

* * * * *